(12) United States Patent
Erfan

(10) Patent No.: US 8,946,117 B2
(45) Date of Patent: Feb. 3, 2015

(54) SPHERICAL CATALYST SUPPORTS

(71) Applicant: Unicat Catalyst Technologies, Inc., Alvin, TX (US)

(72) Inventor: Mani Erfan, Friendswood, TX (US)

(73) Assignee: Unicat Catalyst Technologies, Inc., Alvin, TX (US)

(*) Notice: Subject to any disclaimer, the term of this patent is extended or adjusted under 35 U.S.C. 154(b) by 22 days.

(21) Appl. No.: 13/840,313

(22) Filed: Mar. 15, 2013

(65) Prior Publication Data

US 2014/0274679 A1    Sep. 18, 2014

(51) Int. Cl.
*B01J 23/00* (2006.01)
*B01J 32/00* (2006.01)

(52) U.S. Cl.
CPC ........................................ *B01J 32/00* (2013.01)
USPC ........................................... 502/337; 502/325

(58) Field of Classification Search
CPC .......... B01J 23/63; B01J 23/40; B01J 23/462; B01J 23/58; B01D 53/945
USPC ................................................. 502/337, 325
See application file for complete search history.

(56) References Cited

U.S. PATENT DOCUMENTS

| | | | |
|---|---|---|---|
| 4,325,844 A | 4/1982 | Olmsted, Jr. | |
| 4,581,338 A | 4/1986 | Robertson et al. | |
| 5,418,204 A | 5/1995 | Kolaczkowski et al. | |
| 5,663,473 A | 9/1997 | Griffiths et al. | |
| 2006/0090649 A1* | 5/2006 | Liu et al. | 96/4 |

OTHER PUBLICATIONS

"The MIDREX Process", MIDREX Direct Reduction Process Brochure, Midrex Technologies, Inc., Dec. 2012, pp. 1-24, URL: http://www.midrex.com/uploads/documents/Midrex%20Process%20Brochure%20Dec%2012.pdf.
"MYD-602 Low Activity DRI Catalyst" Brochure, Unicat Catalyst Technologies, Inc., p. 1, Date of publication unknown.
"MYD-604 Medium Activity DRI Catalyst" Brochure, Unicat Catalyst Technologies, Inc., p. 1, Date of publication unknown.
"MYD-608 High Activity DRI Catalyst" Brochure, Unicat Catalyst Technologies, Inc., p. 1, Date of publication unknown.
"MYD-610 Ultra High Activity DRI Catalyst" Brochure, Unicat Catalyst Technologies, Inc., p. 1, Date of publication unknown.

* cited by examiner

*Primary Examiner* — Colleen Dunn
*Assistant Examiner* — Haytham Soliman
(74) *Attorney, Agent, or Firm* — Shaukat A. Karjeker; Carstens & Cahoon, LLP

(57) ABSTRACT

There is presented a catalyst support that has a substantially spherical body, penetrated with a plurality of tunnels extending from a first end on a surface location of the catalyst body to another end on another surface location of the body. The support is made of alumina or like composition. The catalyst body has a total surface that includes the outer surface and surfaces within the tunnels. This total surface is adapted to receive catalyst composition. The catalyst support is adapted to being packed in a reactor and provides lower packed bed pressure drop.

20 Claims, 3 Drawing Sheets

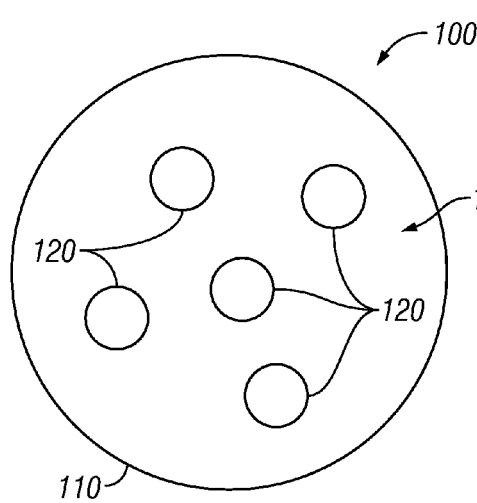
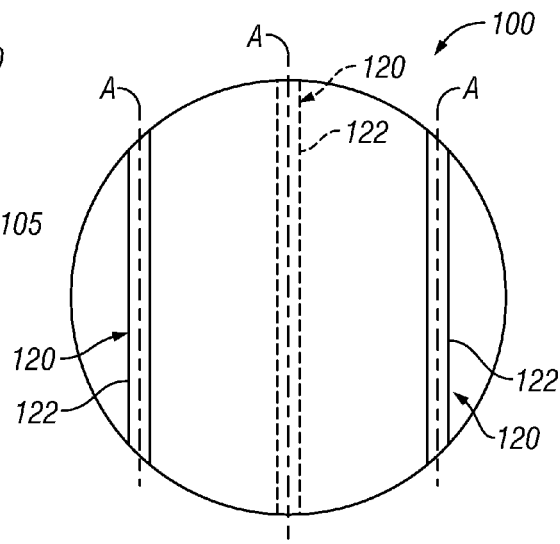
FIG. 1
FIG. 2
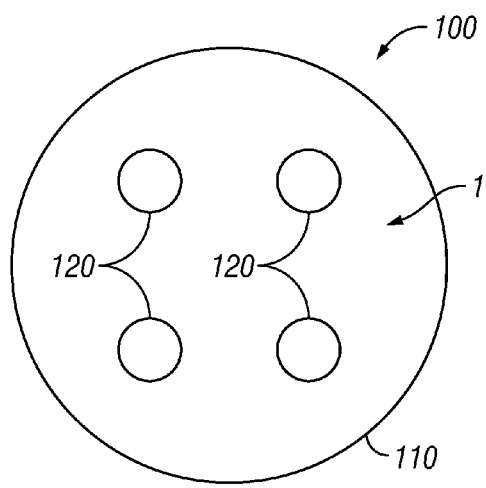
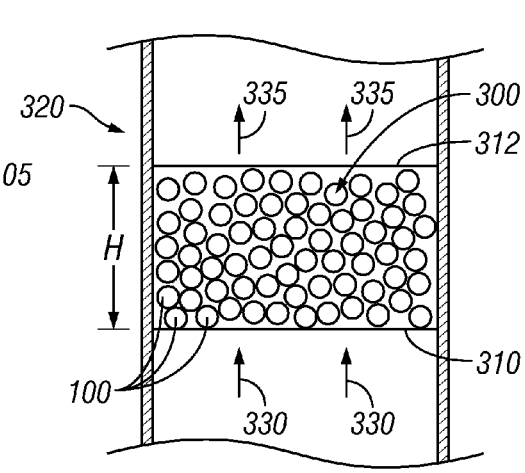
FIG. 3
FIG. 4

SPHERICAL CATALYST SUPPORTS

BACKGROUND

1. Technical Field

The technology relates to the field of chemistry, and more particularly to supported catalysts, catalyst carriers, and catalysts supports. The catalyst supports are spherical in shape and suitable in many applications that require packed supported catalyst or support material in general.

2. Description of the Related Art

Catalysts are used in a variety of chemical reactions, both in the laboratory as well as in industrial applications. Catalysts may be supported or unsupported, homogeneous or non-homogeneous in nature. The common factor among all catalysts is that they are used to either initiate or increase the rate of a chemical reaction, or both, and that they are chemically unchanged by the chemical reaction. They may undergo physical changes, however. In many instances, the catalyst may be regenerated.

In certain industrial processes, it is relatively common that catalysts are supported on inert materials, frequently ceramic materials that play no chemical role in the chemical reactions that are being catalyzed. However, the supports do play a significant physical role in providing the catalyst to the reactants in a way that facilitates the chemical reaction. For example, the catalyst may be distributed on the support surface in such a manner as to provide efficient contact with reactants and thereby promote the desired chemical reaction.

In continuous process industrial applications, the fluid reactants often flow through apparatus and encounter the supported catalysts in packed beds. These packed beds are physical supports within which the supported catalysts are retained as the reactants (and reaction products) flow past them in the continuous processes. These continuous processes using packed beds of catalysts are often encountered in the chemical industry, such as production of ammonia, production of methanol, hydrogen and Syn Gas, in oil refining processes, such as, for example, continuous reforming of naphtha to produce high octane reformate, continuous hydrodesulfurization processes for diesel and kerosene precursors, and hydrocracking to produce hydrogenated shorter chain hydrocarbons from larger chain hydrocarbons. Of course, supported catalysts are used in a wide range of other applications as well, in industries ranging from the manufacture of polymers to the manufacture of iron and steel.

SUMMARY

The following is a summary of some aspects and exemplary embodiments of the present technology, of which a more detailed explanation is provided under the Detailed Description section, here below.

In an exemplary embodiment, there is presented a catalyst support that has a substantially spherical body, which is penetrated with a plurality of tunnels extending from a first end on one surface location of the substantially spherical body to a second end on another surface location of the substantially spherical body. The catalyst body has a total surface that includes an outer surface and surfaces within the plurality of tunnels. This total surface is adapted to receive thereon a catalyst composition. The catalyst support is adapted to being packed in a bed within a packed bed reactor.

Further optionally, each tunnel has a linear axis. Optionally, each of the plurality of tunnels of the catalyst support has substantially cylindrical side walls and has the same internal diameter. Each tunnel may have an internal diameter of from about 8 to about 20% of the diameter of the spherical body. Moreover, each tunnel may be parallel to other tunnels, or substantially so. The plurality of tunnels may range from 3 to 7 tunnels per spherical catalyst support, depending upon the diameter of the support and process requirements.

Optionally, the spherical body of the catalyst support is comprised of alumina, alumina silicate, silica oxide, calcium aluminate and its hydrates, magnesium aluminate and its hydrates, magnesium oxide, any combination alumina oxide and oxides of rare earth metals, such as lanthanum, for example, or cerium, or other rare earth metals; and even diatomaceous earth, if conditions permit. Optionally, the catalyst support may have a diameter in the range from about 12 mm to about 75 mm or more in some circumstances. Further optionally, the catalyst supports may have from about 3 and up to 7 tunnels, depending upon the size of the catalyst support. Alternatively, the catalyst body may have a diameter in the range from 12 to 26 mm, or in the range from 30 to 75 mm, or greater. Optionally, a catalyst support may have a diameter of 28 mm with 3, 4, or 7 tunnels in the catalyst support body.

In another exemplary embodiment, the catalyst support includes a substantially spherical body, penetrated with from 3 to about 7 tunnels extending from a first end on one surface location of the spherical body to a second end on another surface location of the substantially spherical body. The tunnels each have substantially cylindrical side walls, each having an internal diameter ranging from about 8 to about 20% of the diameter of the spherical body. The substantially spherical body has a total surface, including an outer surface and surfaces within the tunnels, that is adapted to receive thereon a catalyst composition. The catalytic composition may be selected from any one or more of nickel, cobalt, platinum, ruthenium, palladium, ruthenium, copper, zinc, iron and mixtures and alloys of these metals. The catalyst support is adapted to being packed in a bed within a packed bed reactor.

BRIEF DESCRIPTION OF THE DRAWINGS

The foregoing aspects and many of the attendant advantages, of the present technology will become more readily appreciated by reference to the following Detailed Description, when taken in conjunction with the accompanying simplified drawings of exemplary embodiments. The drawings, briefly described here below, are not to scale, are presented for ease of explanation and do not limit the scope of the inventions recited in the accompanying patent claims.

FIG. 1 is an illustrative representation of an example of a spherical catalyst support in accordance with the invention, with five tunnels.

FIG. 2 is a view of FIG. 1 depicting the tunnels extending through the catalyst support.

FIG. 3 is an alternative exemplary embodiment of a spherical catalyst support in accordance with the invention, with four tunnels.

FIG. 4 is an illustrative depiction of the catalyst supports stacked in a packed bed.

DETAILED DESCRIPTION

Figure 5:
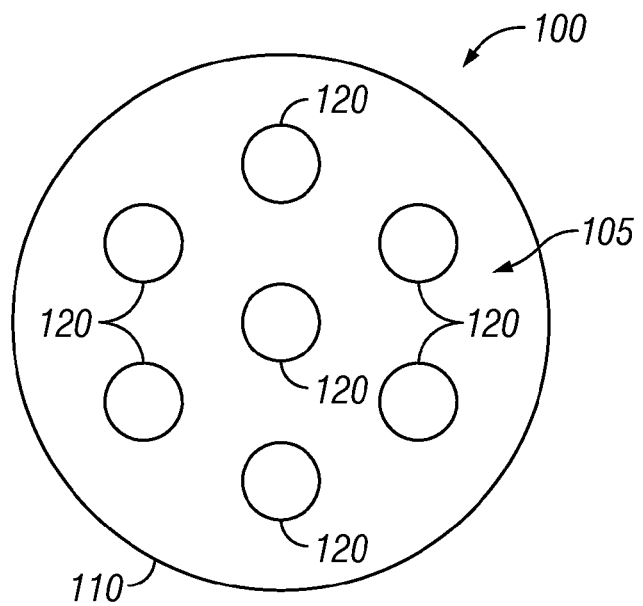
FIG. 5 is an illustrative representation of an example of a spherical catalyst support in accordance with the invention, with seven tunnels.

The following non-limiting detailed descriptions of examples of embodiments of the invention may refer to appended Figure drawings, but are not limited to the drawings, which are merely presented for enhancing explanations of features and aspects of the inventive technology. In addition, the detailed descriptions may refer to particular terms of art, some of which are defined herein, as appropriate and necessary for clarity.

The term "substantially" as used herein to refer to shape or orientation is intended to account for small differences from perfection that arise from mass manufacturing techniques. Thus, "substantially spherical" includes spherical based on ordinary mass manufacturing technique tolerances, and includes ellipsoidal, or other closely similar to spherical shapes, produced within tolerances by that mass manufacturing technology. Likewise "substantially parallel" means as parallel as ordinarily produced by the mass manufacturing technology. The term "similar dimension" used to compare spherical catalyst supports with cylindrical, refers to the diameter of the sphere, as compared to the diameter of the cylinder, which is usually the same as its height/length.

In general, supported catalysts are used in a wide variety of industrial and laboratory applications. The spherical catalyst supports, with catalyst on its surfaces, is ordinarily utilized industrially and in the laboratory, in a "packed bed" that includes a volume of spherical catalysts supported on a suitable grate such that reactant gasses (and products) flow through the grate and through the packed bed. Clearly, the pressure drop through a packed bed is dependent upon several factors, including the catalyst shape, the void space for fluid flow, and the height of the bed. Some catalyst supports, however, have a higher "surface area to volume ratio" ("SA/V") than others. Accordingly, all other parameters being equal, these high SA/V catalyst supports will permit a bed of less height for the same amount of reactant conversion to products on a single pass through the bed. By doing so, these catalysts may in some cases, depending upon the shape of the supports and their resistance to fluid flow in a packed bed, offer an advantage. This is especially the case when the catalyst support maintains (or does not significantly increase) the pressure drop ("ΔP") of fluid flowing through the bed. High pressure drop is frequently undesirable not only because it requires more energy to regain reactant gas pressure for a next pass through a reactor, but because some reactors may be limited in production by pressure drop considerations. For these reactors in particular, a catalyst having a low pressure drop support is a significant advantage.

The exemplary spherical catalyst supports provide a low pressure drop for the same height of a bed of a packed column when it replaces dimensionally similar cylindrical catalysts that also have tunnels, as used in the prior art, and allows a greater packing density. Thus, for example, replacing a packed bed of 16 mm×16 mm cylinders with 16 mm spherical tunneled catalyst results in a greater packing density (by 10%) and improves conversion by 10%. This is an important consideration in steam reforming or DRI-type operations. Moreover, in these operations, where the catalyst is loaded in hundreds of long steel tubes, with a small diameter, in which bridging of cylindrical particles become an issue. Spherical catalysts avoid that issue due to their shape and resultant natural packing in columns.

Due to their spherical shape, the mechanical degradation and abrasion of the catalyst, through contact with each other within the same reactor, is less than in the case of cylindrical supports. There is less dusting, less crushing, and less destructive loss of the catalyst over time. This is an especially significant advantage in direct steam reformers, MIDREX type and DRI type reformers, where the catalyst is loaded into long reactor tubes (See, e.g. FIG. 7) with small internal diameters, where attrition loss is far less than when using prior art cylindrical catalysts. The spherical catalysts are much easier to load since the spheres pack naturally and uniformly so that there is no need for any specialized dense-loading techniques. This minimizes breakage of catalyst. In addition, the spherical catalyst supports have an inherently higher crush strength due to their spherical shape than a standard prior art cylindrical support of the same size.

The spherical catalyst supports provide a lower pressure drop, which is an advantage that translates to an increased conversion advantage, over the prior art cylindrical catalysts. They are particularly suitable for applications where pressure drop through the packed bed poses a challenging issue, or where maximization of packed catalyst density is important. Of particular interest in the current technology, albeit not the sole interest, is the use of supported catalysts of the present technology in the those chemical processes that are appurtenant to the process of making iron and steel. For example, in the Direct Reduction Furnace ("DRF") technology used in connection with making iron and steel. In this technology, gasses are reacted, in the presence of a supported catalyst to produce a gaseous product. In other technologies, for example, direct-fired steam reformers are used to produce a hydrogen-rich product that can be processed into hydrogen, ammonia, and other hydrogen-containing synthetic gasses ("syn gas") according to needs. In addition, there are a variety of other processes, such as Adiabatic Reforming, Auto-Thermal Reforming, and Secondary Steam Reforming that utilize supported catalysts, in which catalyst supports of the present technology find useful application. The spherical supported catalysts of the present technology also find use in Pre-Former or other types of indirect fired furnace designs.

Exemplary embodiments of the spherical catalyst supports may be used as a base to support catalysts that include a fine dispersion of metal including, but not limited to, for example, nickel, platinum, palladium, ruthenium, cobalt, copper, iron, and alloys of the same. Techniques for applying the catalyst to the catalyst supports include solution dipping or dry spraying, which are known in the art. Indeed, the spherical catalyst supports may be provided as a carrier for virtually any catalyst that can be supported, and will find application in those situations where pressure drop must be minimized and/or where activity and conversion must be maximized.

From a standpoint of packing, the round shape of the spherical catalyst supports permits fairly large void spaces in the packed bed, as compared to similarly sized cylinders of the prior art. As a consequence, fluid flow is less significantly impeded, and reactants and products flow through the bed with greater ease and with lower ΔP. Moreover, since the spherical catalyst supports have a plurality of tunnels extending though them, these also provide avenues for fluid flow. This further minimizes ΔP and increases catalyst and fluid contact. The tunnels also beneficially have side walls that may be supplied with catalyst so that the effective area of the spherical support that is treated with catalyst is increased. This allows a higher active surface area to be presented to reactants. This either potentially reduces the bed depth required to achieve a predetermined conversion per pass through the packed bed, or if bed depth is maintained, increases conversion per pass through the packed bed, whichever is more advantageous.

FIGS. 1 and 2 illustrate an exemplary spherical catalyst support 100 that has a spherical body 110 supplied with 5 tunnels 120. The tunnels 120 each extend from one point on the surface 105 of the spherical body 110, through the spherical body 110 to exit at another point on the surface of the body 110. The tunnels 120 may be of any cross sectional shape, for example, circular, ellipsoidal, hexagonal, octagonal, square, and the like. In the case of tunnels 120 with a circular cross section, the side walls 122 are cylindrical, or substantially cylindrical in shape. In addition, the tunnels 120 may be straight (i.e., they may have a central axis A as illustrated), or they may be angular or serpentine. The tunnels 120 may be at angles to each other. For ease of manufacturing, the tunnels 120 may be substantially parallel, as in the illustrated example.

Figure 6:
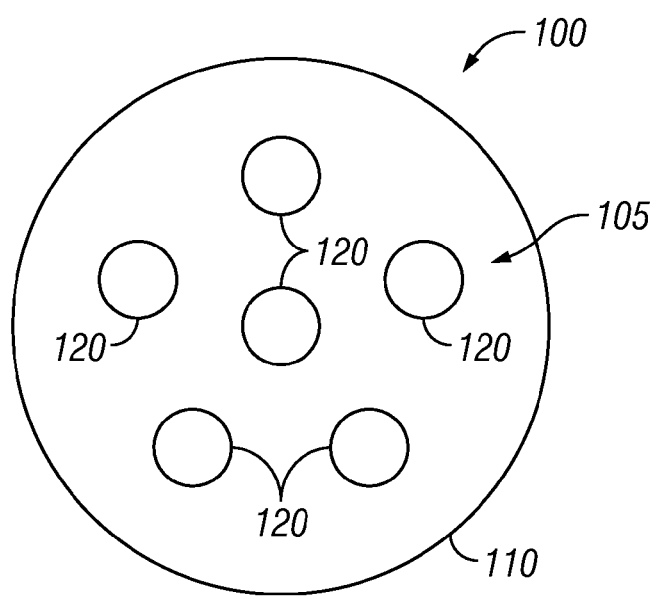
FIG. 6 is an illustrative representation of an example of a spherical catalyst support in accordance with the invention, with six tunnels.

FIG. 3 illustrates another exemplary embodiment of the spherical catalyst support 100. In this embodiment, the catalyst body is penetrated by 4 tunnels 120. In yet other embodiments, the number of tunnels may range from 1 to 7. FIGS. 5 and 6 depict illustratively depict spherical catalyst supports 100 having seven and six tunnels 120, respectively.

The spherical catalyst supports may range in diameter from about 12 mm to about 75 mm or more. In general, the larger the diameter of the spherical catalyst, the greater the number of tunnels it can accommodate while maintaining its mechanical strength advantage over cylindrical catalysts. The technology is not limited by catalyst support size.

FIG. 4 depicts illustratively a cross sectional view of a packed bed 300 within a reactor 320. The bed 300 of spherical catalyst 150 is supported on a grate or bed support 310, while the upper end of the bed is covered by another bed containment support 312. Reactants 330 are shown, in this embodiment, as flowing upward into the bed 300, although, of course, flow can be in any direction. Unreacted reactants and products in stream 335 exit the bed and continue upward, in this exemplary reactor 320. As shown, the packed bed 300 has a height H. There is a pressure drop $\Delta P_{SC}$ across the bed as the stream of fluid 330 passes through the bed to exit as stream 335. This pressure drop is from 10 to 30% or from 15 to 45% lower for the bed height H than it would be for a bed packed with cylinders of equivalent dimensions. In many cases, the pressure drop $\Delta P_{SC}$ across the bed is from about 20 to about 40% less.

Figure 7:
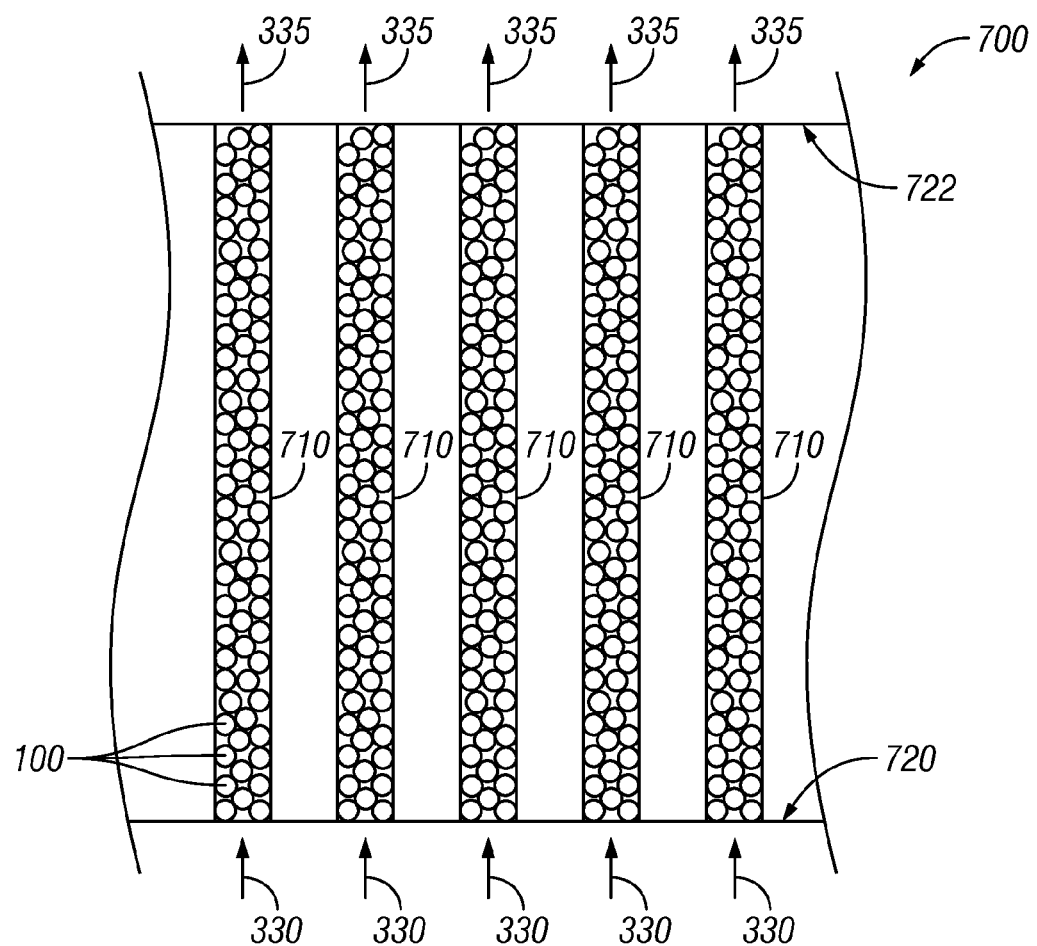
FIG. 7 is an illustrative representation of a cross sectional view of a reactor showing exemplary spherical catalyst loaded into packed beds in reactor tubes.

FIG. 7 depicts a schematic cross section through a reactor 700. The reactor may be, for example, without limitation, an Auto-thermal reformer, Indirect Fired Adiabatic Reformer, a Direct Fired Steam Reformer, a Dry Reforming MIDREX-type reformer, or a secondary steam reformer. The reactor 700 has a plurality of from 6 and up to 800 reactor tubes 710, each filled with spherical tunneled catalyst 100 that form a packed bed in each tube. Lower ends of the reactor tubes rest on a grate 720 and upper ends are covered with grate 722. Reactants 330 flow, in this example, upward through the catalyst beds and product and unreacted catalyst exit through the top grate 722. In an exemplary reactor 700, the reaction tubes 710 may be up to 13 m tall, and may have diameters of from 100 to 150 mm. It has been found that packing spherical tunneled catalyst into such a reactor may be expected to provide an increase in conversion of up to 40% over using similarly dimensioned prior art cylinders with tunnels.

Depending upon the application of the catalyst, the catalyst support material may be selected to withstand operating conditions. Thus, materials of spherical catalyst support composition may range from alumina, alumina silicate, calcium aluminate, magnesium aluminate, magnesium oxide, any combination of the foregoing; and even diatomaceous earth, if conditions permit. The spherical catalyst supports may be mass produced using any applicable catalyst support manufacturing technologies. Of particular interest is the press forming technology. In this technology, the raw carrier catalyst support material is shaped by placement in pre-designed molds, pressed at very high pressure, removed and calcined/baked at appropriate temperatures to be cured and fixed into shape.

Advantageously, regardless of materials of construction, the spherical catalyst supports of the invention exhibit much lower breakage during loading into a packed bed, during shaking of vibration of the bed to settle the supports into packed configuration, and during use. In other words, the catalyst supports are more mechanically durable than prior art cylindrical catalysts with through holes that were typically used in DRI furnaces, for example, and in other applications where the spherical catalysts would be useful in replacing the cylindrical catalysts. Resistance to breakage due to mechanical handling has the advantage of reducing wastage of (broken) catalyst, but also has the advantage of reducing pressure drop caused by broken catalyst clogging or partially obstructing flow passages within the packed bed. This clogging and partial obstruction not only increases pressure drop across the packed bed, but also reduces conversion per pass due to reactants channeling through the bed and portions of the bed not being fully utilized in the process. Accordingly, resistance to breakage in mechanical handling is a significant factor. The spherical catalyst supports, in alumina form, have a radial crush strength of 440 lb-f (200 Kg-f) as compared to a cylinder that has a crush strength of 330-385 lb-f (150-175 Kg-f). Accordingly, alumina spherical catalyst supports with through tunnels have a crush resistance increase of from 12% to 25%, and up to 30%, over prior art alumina cylinders with through tunnels. The same advantage will be found regardless of material of composition of the catalyst support and may be attributable to the novel spherical catalyst shape and configuration.

While examples of embodiments of the spherical catalyst support have been presented and described in text and, in some examples, also by way of illustration, it will be appreciated that various changes and modifications may be made in the described catalyst support without departing from the scope of the inventions, which are set forth in, and only limited by, the scope of the appended patent claims, as properly interpreted and construed.

The invention claimed is:

1. A catalyst support comprising a substantially spherical body, the spherical body penetrated with a plurality of tunnels extending from a first end on one surface location of the substantially spherical body to a second end on another surface location of the substantially spherical body, the spherical body comprising a total surface including an outer surface and surfaces within the plurality of tunnels, the total surface comprising a surface adapted to receive thereon a catalyst composition, the catalyst support adapted to packing in a tubular bed within a packed bed reactor thereby reducing catalyst bridging as compared to cylindrical catalyst, and the catalyst support adapted to provide a lower pressure drop for the same bed height as compared to dimensionally similar cylindrical catalyst that also have tunnels, and higher conversion rate than cylindrical catalyst.

2. The catalyst support of claim 1, wherein the substantially spherical body further comprises on surfaces thereof a catalyst selected from the group of metals consisting of nickel, cobalt, platinum, ruthenium, palladium, ruthenium, copper, zinc, iron and mixtures or alloys thereof.

3. The catalyst support of claim 1, wherein each of the plurality of tunnels comprises substantially cylindrical side walls and has the same diameter.

4. The catalyst support of claim 1, wherein each tunnel has a linear axis.

5. The catalyst support of claim 1, wherein each tunnel comprises substantially cylindrical side walls and has an internal diameter of from about 8% to about 20% of the diameter of the spherical body.

6. The catalyst support of claim 1, wherein each tunnel of the plurality of tunnels is substantially parallel to others of the plurality of tunnels.

7. The catalyst support of claim 1, wherein the spherical body of the catalyst support is comprised of any one or more of alumina, silicates, alumina silicate, calcium aluminate and its hydrates, magnesium aluminate and its hydrates, magnesium oxide, combinations of alumina oxide and oxides of rare earth metals, and diatomaceous earth.

8. The catalyst support of claim 1, wherein the plurality of tunnels comprises from 3 to 7 tunnels.

9. The catalyst support of claim 1, wherein the substantially spherical catalyst body comprises a diameter in the range from 12 to 75 mm.

10. The catalyst support of claim 1, wherein the substantially spherical catalyst body comprises a diameter in the range from 12 to 26 mm.

11. The catalyst support of claim 1, wherein the substantially spherical catalyst body comprises a diameter in the range from 30 to 75 mm.

12. A catalyst support comprising a substantially spherical body, the substantially spherical body penetrated with a plurality of tunnels extending from a first end on one surface location of the spherical body to a second end on another surface location of the substantially spherical body, the substantially spherical body comprising a total surface including an outer surface and surfaces within the plurality of tunnels, the total surface adapted to receive thereon a catalyst composition, the catalyst support adapted for packing in a bed within a tubular bed of a packed bed reactor thereby reducing catalyst bridging in the tubular bed as compared to cylindrical catalyst, and the catalyst support adapted to provide a lower pressure drop for the same bed height as compared to dimensionally similar cylindrical catalyst that also have tunnels, and higher conversion rate than cylindrical catalyst.

13. The catalyst support of claim 12, wherein each tunnel comprises has an internal diameter of from about 8 to about 20% of the diameter of the spherical body.

14. The catalyst support of claim 12, wherein each of the plurality of tunnels is substantially parallel.

15. The catalyst support of claim 12, wherein the spherical body of the catalyst support is comprised of any one or more of alumina, silicates, alumina silicate, calcium aluminate and its hydrates, magnesium aluminate and its hydrates, magnesium oxide, combinations of alumina oxide and oxides of rare earth metals, and diatomaceous earth.

16. The catalyst support of claim 12, wherein the plurality of tunnels comprises from 3 to 7 tunnels.

17. The catalyst support of claim 12, wherein the substantially spherical catalyst body comprises a diameter in the range from 12 to 75 mm.

18. The catalyst support of claim 12, wherein the substantially spherical catalyst body comprises a diameter in the range from 12 to 26 mm.

19. A catalyst support comprising a substantially spherical body, the substantially spherical body penetrated with from 3 to about 7 tunnels extending from a first end on one surface location of the spherical body to a second end on another surface location of the substantially spherical body, the tunnels each having an internal diameter ranging from about 8 to about 20% of the diameter of the spherical body; the substantially spherical body comprising a total surface including an outer surface and surfaces within the tunnels, the total surface comprising a surface adapted to receive thereon a catalyst composition comprising any one or more of surfaces thereof a catalyst selected from the group of metals consisting of nickel, cobalt, platinum, ruthenium, palladium, ruthenium, copper, zinc, iron and mixtures and alloys thereof, the catalyst support adapted for packing in a bed within a tubular bed of a packed bed reactor thereby reducing catalyst bridging as compared to cylindrical catalyst, and the catalyst support adapted to provide a lower pressure drop for the same bed height as compared to dimensionally similar cylindrical catalyst that also have tunnels, and higher conversion rate than cylindrical catalyst.

20. The catalyst support of claim 19, wherein the tunnels are substantially parallel to each other.

* * * * *